(12) United States Patent
Shiomi (10) Patent No.: US 9,367,492 B2
(45) Date of Patent: Jun. 14, 2016

(54) STORAGE VIRTUALIZATION APPARATUS CAUSING ACCESS REQUEST PROCESS TO BE DELAYED BASED ON INCOMPLETE COUNT AND STORAGE VIRTUALIZATION METHOD

(71) Applicant: FUJITSU LIMITED, Kawasaki-shi, Kanagawa (JP)

(72) Inventor: Hiroshi Shiomi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 249 days.

(21) Appl. No.: 13/898,541

(22) Filed: May 21, 2013

(65) Prior Publication Data
US 2014/0006725 A1  Jan. 2, 2014

(30) Foreign Application Priority Data
Jun. 27, 2012  (JP) .................................. 2012-144351

(51) Int. Cl.
G06F 13/16 (2006.01)
H04L 29/08 (2006.01)
G06F 3/06 (2006.01)

(52) U.S. Cl.
CPC ............ *G06F 13/1657* (2013.01); *G06F 3/067* (2013.01); *G06F 3/0611* (2013.01); *G06F 3/0659* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 6,694,390 B1 * | 2/2004 | Bogin et al. | 710/53 |
| 2004/0230742 A1 * | 11/2004 | Ikeuchi et al. | 711/112 |
| 2005/0066138 A1 * | 3/2005 | Horn | G06F 9/4881 |
| | | | 711/158 |
| 2013/0166797 A1 * | 6/2013 | Komikado | 710/74 |

FOREIGN PATENT DOCUMENTS

| | | |
|---|---|---|
| EP | 1596303 | 11/2005 |
| JP | 2004-295860 | 10/2004 |
| JP | 2005-326935 | 11/2005 |

* cited by examiner

*Primary Examiner* — Reginald Bragdon
*Assistant Examiner* — Edward Wang
(74) *Attorney, Agent, or Firm* — Fujitsu Patent Center (57) ABSTRACT

A storage virtualization apparatus includes: a first storing unit to store, with respect to each storage port, a process incomplete command count defined as number of commands not yet processed by the storage device having each storage port; a control unit to obtain process incomplete command counts accumulated by other storage virtualization apparatuses, and stores into a second storing unit a process incomplete command total count that is a total of the process incomplete command counts obtained from the other storage virtualization apparatuses and the first storing unit; and an access request responding unit to, when receiving an access request, obtain the process incomplete command total count about a storage port corresponding to the received access request, and to, when the obtained process incomplete command total count is larger than a prescribed number, cause completion timing of an access responding process to the access request to be delayed.

11 Claims, 11 Drawing Sheets

STORAGE VIRTUALIZATION APPARATUS CAUSING ACCESS REQUEST PROCESS TO BE DELAYED BASED ON INCOMPLETE COUNT AND STORAGE VIRTUALIZATION METHOD

CROSS-REFERENCE TO RELATED APPLICATIONS

This application is based upon and claims the benefit of priority of the prior Japanese Patent Application No. 2012-144351, filed on Jun. 27, 2012, the entire contents of which are incorporated herein by reference.

FIELD

The present invention relates to a storage virtualization apparatus and a storage virtualization method for virtualizing a plurality of storage devices, and a non-transitory computer readable medium stored with a storage virtualization program for virtualizing storage devices.

BACKGROUND

Over the recent years, almost all pieces of work (business) have been performed making use of computers, and consequently the number of the storage devices used to retain data has increased. Moreover, it is hard to manage many storage devices, and therefore storage virtualization is done in order to mitigate the system administrator's burden, etc.

Figure 1:
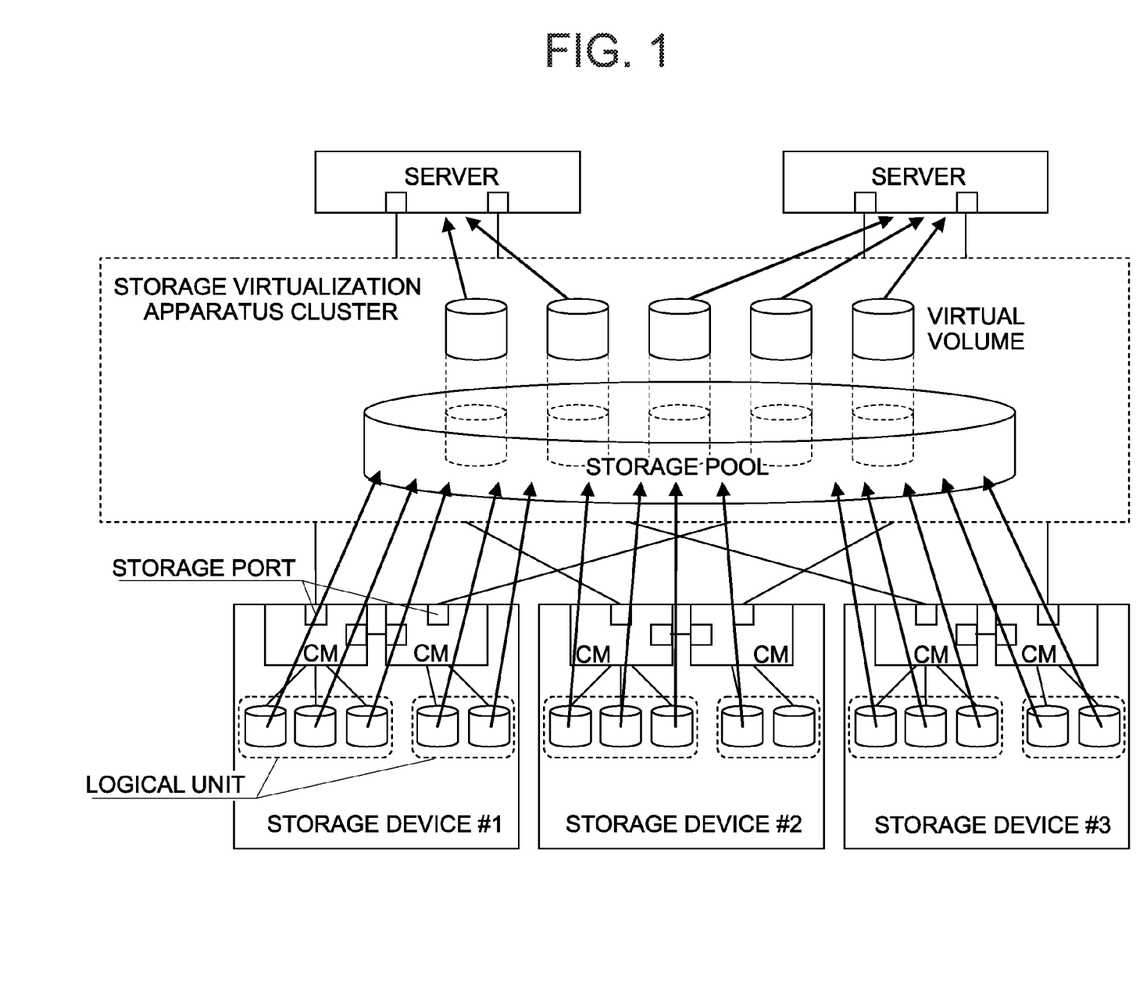
FIG. 1 is an explanatory diagram of a storage virtualization system.

Storage virtualization is done, as schematically illustrated in FIG. 1, by connecting a plurality of storage devices and a plurality of servers through a storage virtualization apparatus cluster consisting of a plurality of storage virtualization apparatuses (not illustrated).

The storage virtualization apparatus is an apparatus capable of integrally managing all logical units of the plurality of storage devices as one virtual storage pool and extracting from the storage pool a virtual volume of arbitrary size, which is seen as one storage device by the servers.

When receiving an access request from a server to a virtual volume, the storage virtualization apparatus refers to the mapping information set in its inside, thereby specifying a storage port to which a command corresponding to the received access request is to be issued. Then, the storage virtualization apparatus issues the command to the specified storage port.

DOCUMENTS OF RELATED ARTS

Patent document 1: Japanese Laid-Open Patent Publication No. 2004-295860
Patent document 2: Japanese Laid-Open Patent Publication No. 2005-326935

To the storage port of the storage device, commands can be enqueued to some extent. However, when Queue Full occurs in the storage port (when a command queue in the storage port becomes full) as a result of continuous input of many commands, the storage port will go into the state where it does not accept a command.

The storage device (see FIG. 1), which is connected to the storage virtualization apparatus, generally has two redundant storage ports. Hence, even if Queue Full occurs at one storage port, it is possible to access the logical units in the storage device by using the other storage port. However, when Queue Full has occurred in a storage port, since commands which are received till then by two storage ports are received by only one storage port where Queue Full has not occurred, Queue Full of the storage port tends to be spawned frequently.

Figure 2:
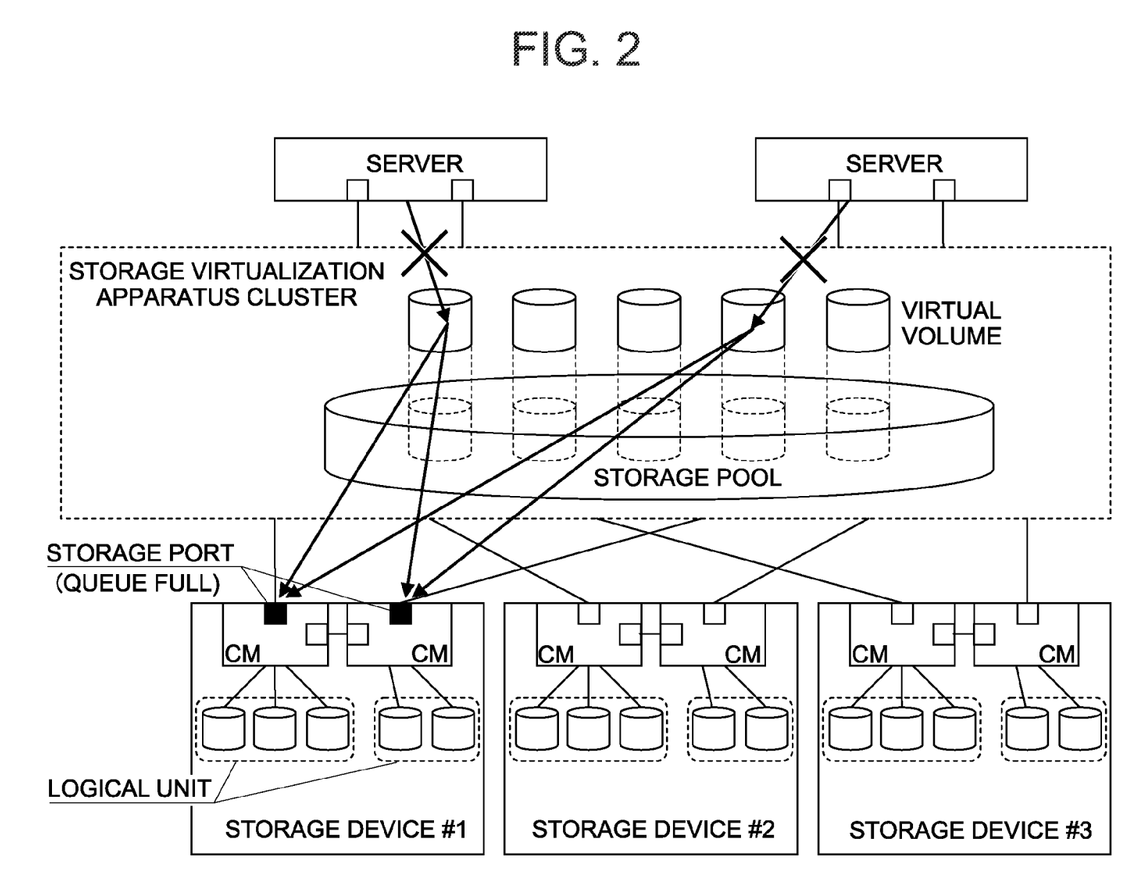
FIG. 2 is an explanatory diagram of problem that arises in the storage virtualization system.

If Queue Full occurs in all the storage ports of a storage device, it follows that every logical volume related to the storage device (logical units in the storage device) can not be used. For instance, in a case where Queue Full occurs in two storage ports of the storage device #1 in FIG. 1 and there exist two logical volumes related to the storage device #1, as schematically illustrated in FIG. 2, these two logical volumes can not be used.

Accordingly, the system (FIG. 1) using storage virtualization apparatuses is desired to be one where Queue Full does not occur in either of the storage ports across the storage devices. But currently, since it is very difficult to design/operate the storage virtualization apparatus so that Queue Full may occur in neither of the storage ports, the storage virtualization apparatus capable of constructing the storage virtualization system in which Queue Full hardly occurs in every storage port has not been actualized.

SUMMARY

According to an aspect of the disclosed technique, a storage virtualization apparatus capable of being connected with a plurality of storage ports across a plurality of storage devices includes:

a first storing unit to store, with respect to each of the plurality of storage ports, a process incomplete command count defined as number of commands that are not yet processed by the storage device having each storage port;

a control unit to obtain, from each of other storage virtualization apparatuses connected to any one of the plurality of storage ports, the process incomplete command count accumulated by the storage virtualization apparatus, and stores into a second storing unit, with respect to each of the plurality of storage ports, a process incomplete command total count that is a total of the process incomplete command count obtained from each of the other storage virtualization apparatuses and the process incomplete command count obtained from the first storing unit; and an access request responding unit to, when receiving an access request against any one of the plurality of storage devices, obtain the process incomplete command total count about a storage port corresponding to the received access request from the second storing unit, and to, when the obtained process incomplete command total count is larger than a prescribed number, cause completion timing of an access responding process to the access request to be delayed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Some embodiments of the present invention will hereinafter be described with reference to the drawings.

First Embodiment

To start with, use and configuration of a storage virtualization apparatus 10 according to the first embodiment will be explained referring to FIGS. 3 and 4.

Figure 3:
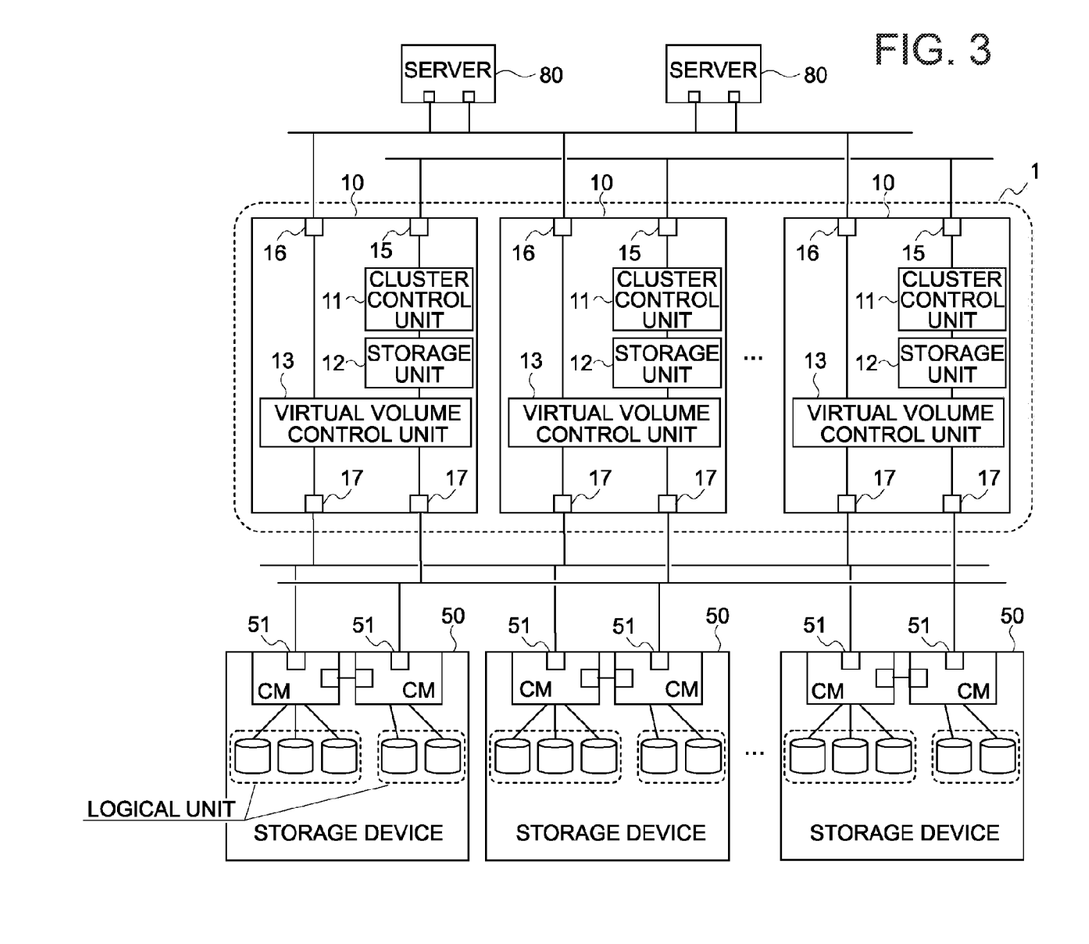
FIG. 3 is an explanatory diagram illustrating a configuration and a use pattern of a storage virtualization apparatus according to a first embodiment.

As illustrated in FIG. 3, the storage virtualization apparatus 10 according to the present embodiment is an apparatus used as a component of a storage virtualization apparatus cluster 1 that connects between a plurality of servers 80 and a plurality of storage devices 50.

The storage virtualization apparatus 10 is an apparatus that causes the plurality of storage devices 50 connected with itself to function as one or more virtual volumes. As illustrated in FIG. 3, the storage virtualization apparatus 10 includes a cluster control unit 11, a storage unit 12 and a virtual volume control unit 13. Further, the storage virtualization apparatus 10 includes a port 15 (for example, a LAN port) to communicate with other storage virtualization apparatuses 10 and a port 16 (for example, a fibre channel port) to communicate with the servers 80. Moreover, the storage virtualization apparatus 10 includes two ports 17 (for example, SAS (Serial Attached SCSI) ports) that will be connected with a plurality of storage ports 51 across the plurality of storage devices 50.

Although, in FIG. 3, illustrated is the storage device 50 provided with a plurality of disk drives and two controller modules (CMs) each having the storage port 51, the storage virtualization apparatus 10 may also be connected to the storage device 50 (not illustrated) that has only one number of the storage ports 51.

Figure 4:
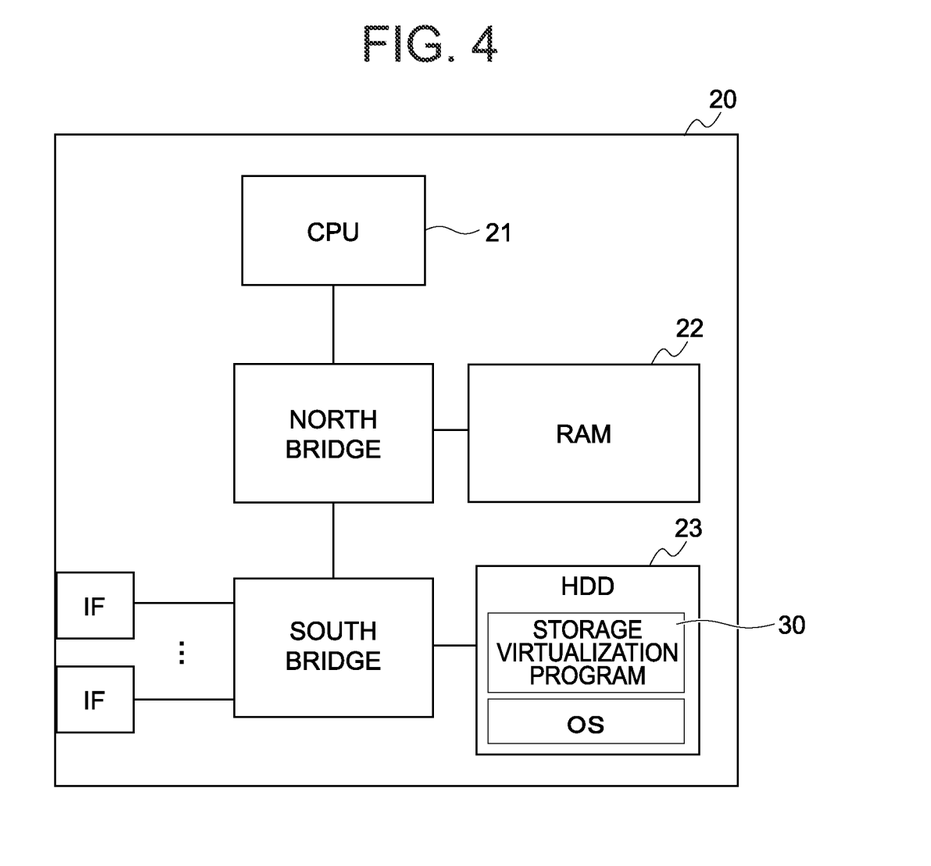
FIG. 4 is a block diagram of the storage virtualization apparatus according to the first embodiment.

Further, the storage virtualization apparatus 10 according to the present embodiment is in reality, as shown in FIG. 4, a computer 20 having a generic configuration where a storage virtualization program 30 is installed on its HDD (Hard Disk Drive) 23 from a portable recording medium (not illustrated) such as a CD-ROM etc. Each of the cluster control unit 11 and the virtual volume control unit 13 (FIG. 3) of the storage virtualization apparatus 10 is equivalent to a CPU (Central Processing Unit) 21 performing specific processing according to the storage virtualization program 30. Further, the storage unit 12 is equivalent to the HDD 23 and a RAM (Random Access Memory) 22 of the computer 20, and the ports 15-17 is equivalent to the various interface circuits ("IF" in FIG. 4) of the computer 20.

The configuration and the operation of the storage virtualization apparatus 10 according to the present embodiment will be hereinafter described more specifically.

The storage virtualization apparatus 10 (FIG. 3) is given a function of issuing many commands to a storage port 51 while accumulating a difference between command counts, and outputting the difference between command counts (denoted hereafter as the queueable command number) at the point at which the storage port 51 becomes impossible to accept a command (at the point when Queue Full occurs). Note that, the difference between command counts is defined as the difference between the number of issued commands and the number of commands, responses to which have been obtained ("the number of issued commands"-"the number of the commands, responses to which have been obtained").

At the time of introduction (a setup) of the storage virtualization apparatus cluster 1, the queueable command number regarding each storage port 51 connected with each storage virtualization apparatus 10 is measured using the above-mentioned function. Thereafter, a upper threshold and a lower threshold that satisfies "the queueable command number>the upper threshold>the lower threshold" is determined with respect to each of the storage ports 51, and the determined upper thresholds and lower thresholds about the storage ports 51 are registered into the storage unit 12 of each storage virtualization apparatus 10.

Incidentally, at the time of the determination of the upper threshold and the lower threshold, not only the queueable command number but also the execution period of the process of step S102 (FIG. 5), which will be detailed later, and the frequency of the access requests from the servers 80 are taken into consideration. Further, as to each storage port 51 that has been turned out to have the same specification with the storage port 51 whose queueable command number is already measured, measurement of the queueable command number is omitted. As the upper threshold and the lower threshold of each of such storage ports 51, registered are the upper threshold and the lower threshold that are determined from the measurement result of the queueable command number about another storage port 51 having the same specification.

When starting the operation of the storage virtualization apparatus cluster 1, also performed are an operation to set (specify) the storage virtualization apparatus 10 that is made to function as a master virtualization apparatus (details of which are given later on) and an operation to register virtual volumes (an operation to register mapping information indicating the correspondence relationship between each virtual volume and actual disk drives into the storage unit 12 of each storage virtualization apparatus 10).

When the above various operations (denoted hereinafter as the setup operation) are completed, each part of the storage virtualization apparatus 10 will go in the status of actually working.

First, an operation of the cluster control unit 11 will be described. Note that, in the following explanation, the master virtualization apparatus is the storage virtualization apparatus 10 which is operating as the master virtualization apparatus (which is set to operate as the master virtualization apparatus). Further, the slave virtualization apparatus is the storage virtualization apparatus 10 that is not the master virtualization apparatus.

Figure 5:
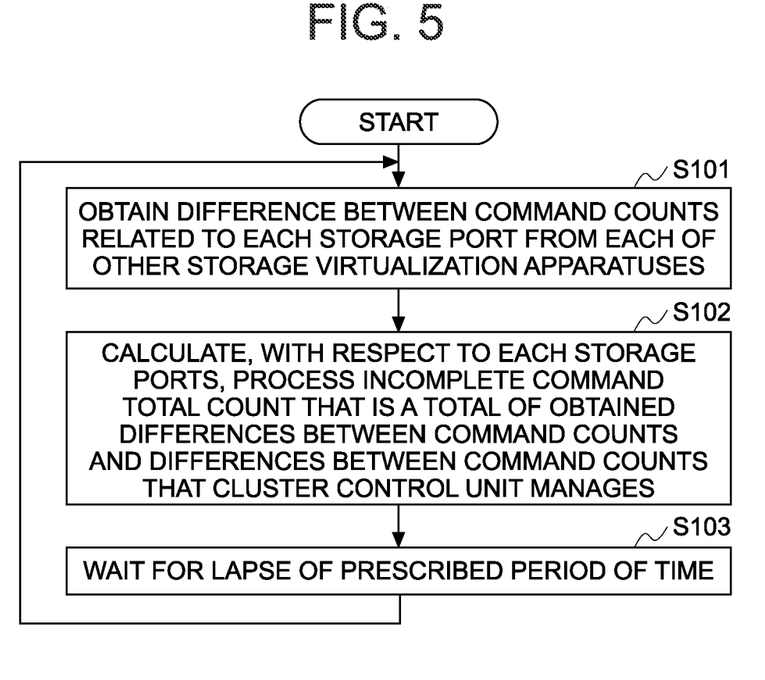
FIG. 5 is a flowchart of an information interchange process performed by the cluster control unit of the storage virtualization apparatus according to the first embodiment.

When the setup operation is completed, the cluster control unit 11 in the master virtualization apparatus starts an information interchange process in a procedure illustrated in FIG. 5.

Namely, the cluster control unit 11 in the master virtualization apparatus which started this information interchange process, at first, obtains the difference between command counts related to each storage port 51 from each slave virtualization apparatus (each of other storage virtualization apparatuses 10) by sending a predetermined request for the difference of the command counts (step S101).

Although update procedure of the difference between command counts (the difference between the number of issued commands and the number of the commands the responses to which have been obtained) will be mentioned later on, each difference of command counts is stored in the storage unit 12 of each storage virtualization apparatus 10. Moreover, the request for the difference of the command counts is a request that is received by the cluster control unit 11 in the slave virtualization apparatus, and the cluster control unit 11 in the slave virtualization apparatus, when receiving the request for the difference of the command counts, reads the difference of the command counts related to each storage port 51 from the storage unit 12 and sends back them to the master virtualization apparatus.

The cluster control unit 11 having finished the process of step S101 calculates, with respect to each of the storage ports 51, a process incomplete command total count that is a total of the differences between the command counts obtained from the slave virtualization apparatuses and the differences between the command counts that the cluster control unit 11 manages as information in the storage unit 12. That is to say, the cluster control unit 11 in the master virtualization apparatus calculates, with respect to each of the storage ports 51, the process incomplete command total count that is equivalent with "the number of commands which are inputted into a storage port 51 from one of the storage virtualization apparatus 10 and the process for which within the storage device 50 has not completed."

At step S102, the cluster control unit 11 also performs a process of rewriting the process incomplete command total count in the storage unit 12 related to each storage port 51 with the calculated process incomplete command total count related to each storage port 51.

Moreover, the cluster control unit 11 also performs at step S102 a process of distributing every calculated process incomplete command total count to each of the other storage virtualization apparatuses 10 (the slave virtualization apparatuses). Then, in each slave virtualization apparatus to which the various process incomplete command total counts are distributed from the master virtualization apparatus, the cluster control unit 11 performs a process of writing the distributed process incomplete command total count related to each storage port 51 instead of the corresponding process incomplete command total count in the storage unit 12.

After finishing the process of step 102, the cluster control unit 11 waits for a lapse of a prescribed period of time (step S103), and thereafter performs again processing subsequent to step S101.

Given next is an explanation of an operation of the virtual volume control unit 13.

Figure 6:
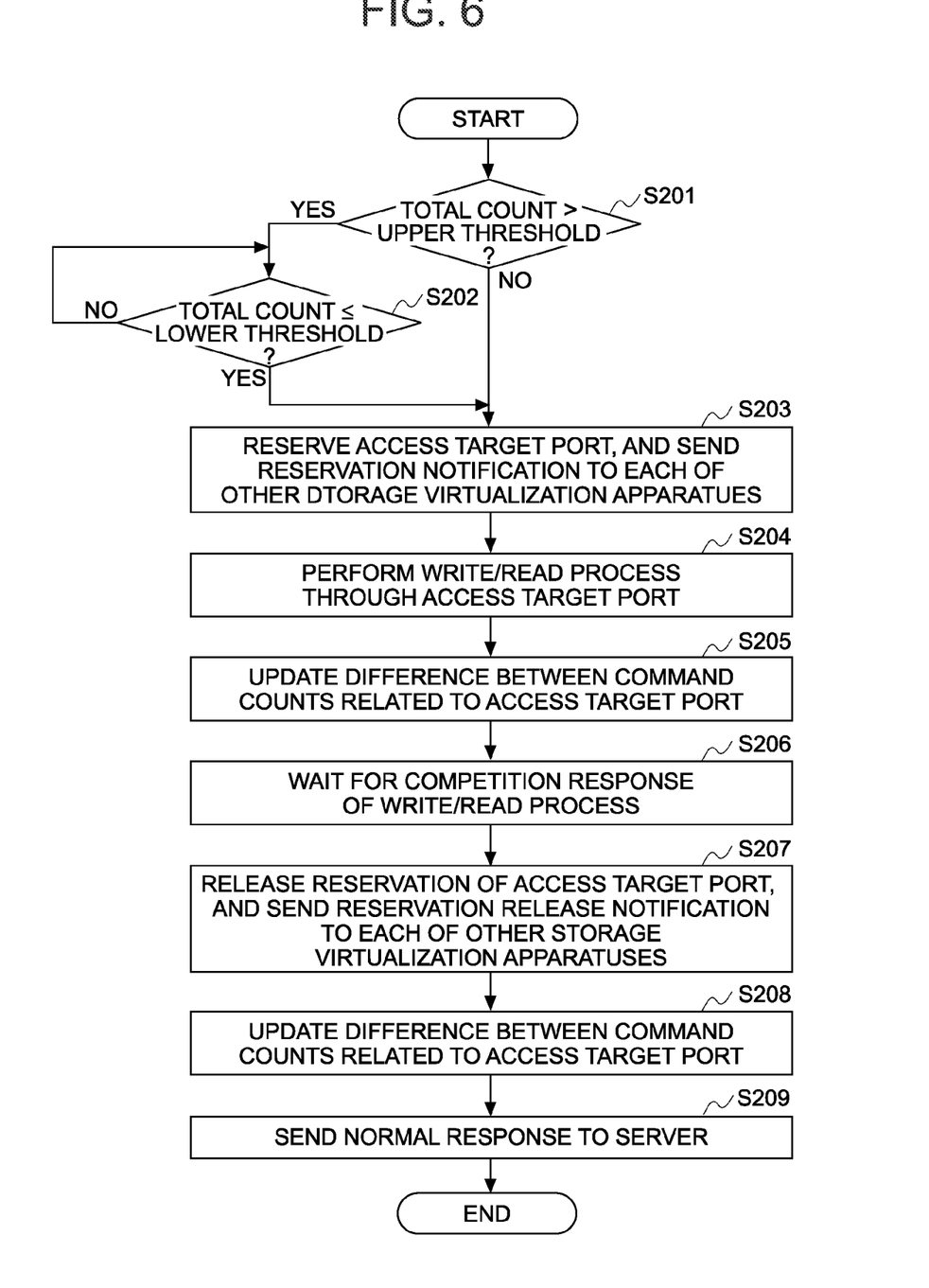
FIG. 6 is a flowchart of a virtual volume control process performed by the virtual volume control unit of the storage virtualization apparatus according to the first embodiment performs.

When the setup operation is completed, the virtual volume control unit 13 in each storage virtualization apparatus 10 (the master/slave virtualization apparatus) comes to a status of starting, when receiving an access request for a virtual volume from a server 80, a virtual volume control process in a procedure illustrated in FIG. 6.

Namely, the virtual volume control unit 13 having received an access request from a server 80, to begin with, refers to the mapping information, thereby specifying the storage port 51 to which a command for responding the access request is to be issued (which will be hereinafter denoted as the access target port) (step S201). Then, the virtual volume control unit 13 compares the process incomplete command total count ("total count" in FIG. 6) and the upper threshold which are stored in the storage unit 12 as information related to the access target port (step S201).

When the process incomplete command total count related to the access target port is less than or equal to the upper threshold related to the access target port (step S201; NO), the virtual volume control unit 13 reserves the access target port and sends reservation notification to each of other storage virtualization apparatuses 10 (step S203).

Subsequently, the virtual volume control unit 13 issues to the access target port a read/write command for making the storage device 50 (the CM in the storage device 50) perform a read/write process the contents of which is specified by the received access request (step S204).

Moreover, the virtual volume control unit 13 performs a process of updating the difference of the command counts related to the access target port stored in the storage unit 12 (step S205). As already explained, the difference of the command counts is the difference between the number of the issued commands and the number of commands the responses to which are obtained ("the number of the issued commands"-"the number of the commands the response to which are obtained"). Therefore, at this step S205, performed is a process of adding "1" to the difference of the command counts related to the access target port.

The virtual volume control unit 13 having finished the process of step S205 waits for receiving a completion response (information indicating that the write process is completed, data read by the read process) of the write/read process from the access target port (step S206).

The virtual volume control unit 13 having received the completion response releases the reservation of the access target port and sends the reservation release notification to each of other storage virtualization apparatus 10 (step S207). At subsequent step S208, the virtual volume control unit 13 performs a process of updating the difference between the command counts related to the access target port (a process of subtracting "1" from the difference between the command counts related to the access target port in the storage unit 12).

Then, the virtual volume control unit 13 sends back a normal response (information indicating that the write process is completed, the data read by the read process) to the server 80 that has transmitted the access request (step S209), and thereafter finishes the virtual volume control process.

On the other hand, when the process incomplete command total count is greater than the upper threshold (step S201; YES), the virtual volume control unit 13 waits until the process incomplete command total count related to the access target port becomes a value less than or equal to the lower threshold related to the access target port (step S202).

Namely, the virtual volume control unit 13 waits until the process incomplete command total count related to the access target port is rewritten with a value less than or equal to the lower threshold related to the access target port by the information exchange process (FIG. 5) in consequence of progress of processing to commands queued within the access target port.

Then, when the process incomplete command total count related to the access target port becomes a value less than or equal to the lower threshold related to the access target port (step S202; YES), the virtual volume control unit 13 performs the already-explained processes of steps S203-S209, and thereafter finishes the virtual volume control process.

As described above, the storage virtualization apparatus 10 according to the present embodiment constantly accumulates the difference between the command counts (the value obtained by subtracting the number of the commands the responses to which are obtained from the number of the commands that the storage virtualization apparatus has issued) related to each storage port 51. The master virtualization apparatus also periodically obtains the difference between the command counts related each storage port 51 from each slave virtualization apparatus, and calculates, with respect to each storage port 51, the process incomplete command total count that is a total of the differences between the command counts that the master virtualization apparatus itself accumulates and the differences between the command counts that the slave virtualization apparatus accumulates. Further, the master virtualization apparatus stores the calculated results internally (in the storage unit 12) and distributes them to each slave virtualization apparatus, and each slave virtualization apparatus, to which process incomplete command total counts related to storage ports 51 are distributed, stores the calculated results internally (in the storage unit 12).

Moreover, when receiving an access request from a server 80, the storage virtualization apparatus 10 (the master/slave virtualization apparatus) compares the process incomplete command total count related to the access target port with the upper threshold related to the access target port that is determined based on the queueable command number (FIG. 6; step S201). When the process incomplete command total count is larger the upper threshold (step S201; YES), the storage virtualization apparatus 10 waits for the process incomplete command total count to become a value less than the lower threshold (which is less than the upper threshold) (step S202; NO), and then starts the actual processes (steps S203-S209) to the received access request.

In short, each storage virtualization apparatus 10 in the storage virtualization apparatus cluster 1 operates in such a status that it holds, with respect to each of the plurality of storage port 51, the process incomplete command total count that is roughly equivalent to the number of commands remaining in the queue within the storage port 51. Then, each storage virtualization apparatus 10, in a case where Queue Full is likely to occur, wait until commands in the queue of the access target port are processed to some extent, and issues a command to the access target port.

The storage virtualization apparatus 10 according to the present embodiment is one that operates as mentioned above. Accordingly, with this storage virtualization apparatus used, it is feasible to construct easily (in a way that does not require a system design in consideration performance, etc. of each storage device 50) the storage virtualization system in which Queue Full hardly occurs at each storage port 51 across the storage devices 50.

Second Embodiment

A configuration and an operation of a storage virtualization apparatus 10 according to a second embodiment will be explained in a way that puts a focus on differences from the above-mentioned storage virtualization apparatus 10 according to the first embodiment.

Figure 7:
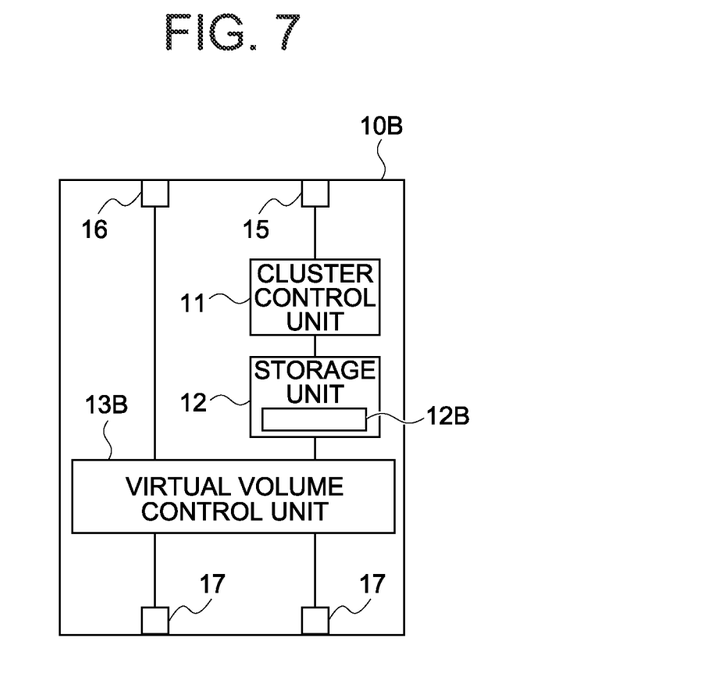
FIG. 7 is a functional block diagram of a storage virtualization apparatus according to a second embodiment.

FIG. 7 is a functional block diagram of the storage virtualization apparatus 10B according to the second embodiment. Note that, the storage virtualization apparatus 10B is an apparatus that is used in the same way (FIG. 3) as the storage virtualization apparatus 10. Further, the storage virtualization apparatus 10B is, as with the storage virtualization apparatus 10, the computer 20 on which the storage virtualization program 30 (contents of which is different from that of the first embodiment) is installed As illustrated in FIG. 7, the storage virtualization apparatus 10B includes a cluster control unit 11, a storage unit 12 and a virtual volume control unit 13B. Further, the storage virtualization apparatus 10B includes a port 15 to communicate with other storage virtualization apparatuses 10B, a port 16 to communicate with the servers 80 (see FIG. 3), and two ports 17 that will be connected with a plurality of storage ports 51 (see FIG. 3) across the plurality of storage devices 50.

The cluster control unit 11, the storage unit 12 and the ports 15-17 of this storage virtualization apparatus 10B are the same as the cluster control unit 11, the storage unit 12 and the ports 15-17 of the storage virtualization apparatus 10, respectively. However, part of the storage area (part of the storage areas of RAM 22 in FIG. 4) of the storage unit 12 in the storage virtualization apparatus 10B is used as a cache memory 12B.

The virtual volume control unit 13B is a unit (a functional block) corresponding to the virtual volume control unit 13 to which the function to use the cache memory 12B is added.

An operation of the virtual volume control unit 13B to a read request and an operation of the virtual volume control unit 13B to a write request will be separately described below.

Operation to a Read Request

When receiving a read request, the virtual volume control unit 13B, at first, judges whether there exists data, which is requested by the read request to be read, in the cache memory 12B.

When there exists the data requested by the read request to be read in the cache memory 12B, the virtual volume control unit 13B reads the data from the cache memory 12B. Then, the virtual volume control unit 13B sends back the read data to the server 80 that has transmitted the read request, and thereafter terminates the processing to the received read request.

On the other hand, when there does not exist the data requested by the read request to be read in the cache memory 12B, the virtual volume control unit 13B performs a process corresponding to the above-mentioned virtual volume control process (FIG. 6) involving a step of caching the data read from the storage device 50. Then, the virtual volume control unit 13B having finished the process terminates the processing to the received read request.

Operation to Write Request

Figure 8:
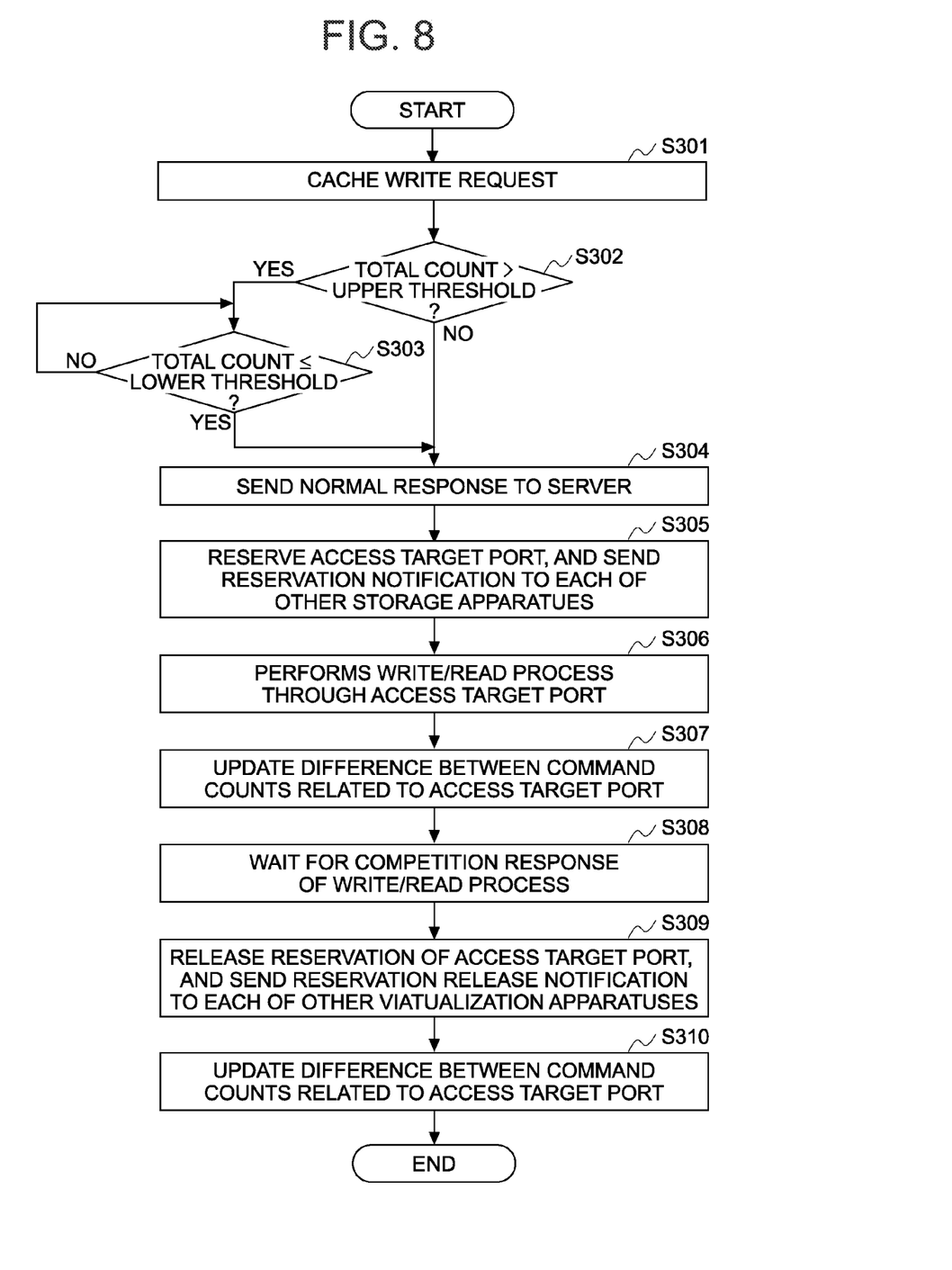
FIG. 8 is a flowchart of a write request responding process performed by a virtual volume control unit of the storage virtualization apparatus according to the second embodiment.

When receiving a write request, the virtual volume control unit 13B performs a write request responding process in a procedure illustrated in FIG. 8.

That is, the virtual volume control unit 13B receiving the write request, at first, caches the received write request into the cache memory 12B (step S301).

At subsequent step S302, the virtual volume control unit 13B performs a process (decision) identical with the already explained process (FIG. 6) of step S201. Then, the virtual volume control unit 13B, when the process incomplete command total count related to the access target port is less than or equal to the upper threshold related to the access target port (step S302; NO), sends back a normal response (write-in completion notification) to the server 80 that has transmitted the access request (step S304).

The virtual volume control unit 13B performs processes at step S305-S310 which are identical with the already explained processes at step S203-S208, respectively. Then, the virtual volume control unit 13B having finished the process of step S310 terminates the write request responding process.

On the other hand, when the process incomplete command total count is larger than the upper threshold (step S302; YES), the virtual volume control unit 13B waits until the process incomplete command total count related to the access target port becomes a value less than or equal to the lower threshold related to the access target port (step S303).

Then, when the process incomplete command total count related to the access target port becomes a value less than or equal to the lower threshold related to the access target port (step S303; YES), the virtual volume control unit 13B performs processing subsequent to step S304.

As is clear from the description given above, this storage virtualization apparatus 10B is, as with the storage virtualization apparatus 10, an apparatus that, when the process incomplete command total count is larger than the upper threshold, waits until the process incomplete command total count becomes a value less than or equal to the lower threshold, and thereafter issues the competition response to the access target port. Accordingly, with the storage virtualization apparatus 10B used, it is feasible to construct easily (in a way that does not require a system design in consideration performance, etc. of each storage device 50) the storage virtualization system in which Queue Full hardly occurs at each storage port 51 across the storage devices 50.

Moreover, the storage virtualization apparatus 10B responds an access request using the cache memory 12B. The storage virtualization apparatus 10B can be therefore said to be the apparatus that can respond to an access request earlier than the storage virtualization apparatus 10.

Third Embodiment

A configuration and an operation of a storage virtualization apparatus 10 according to a second embodiment will be explained in a way that puts a focus on differences from the above-mentioned storage virtualization apparatus 10 according to the first embodiment.

Figure 9:
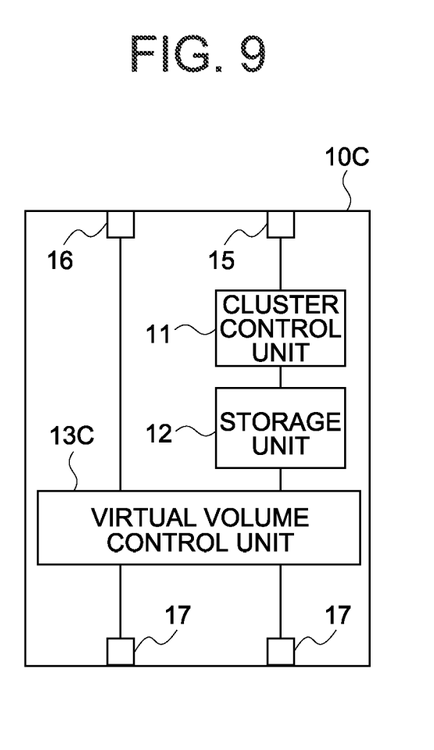
FIG. 9 is a functional block diagram of a storage virtualization apparatus according to the third embodiment.

The configuration of the storage virtualization apparatus 10C according to the third embodiment is shown in FIG. 9. FIG. 9 is a functional block diagram of the storage virtualization apparatus 10C according to the third embodiment. Note that, the storage virtualization apparatus 10B is an apparatus that is used in the same way (FIG. 3) as the storage virtualization apparatuses 10 and 10B. Further, the storage virtualization apparatus 10B is, as with the storage virtualization apparatuses 10 and 10B, the computer 20 on which the storage virtualization program 30 (contents of which is different from that of the first or second embodiment) is installed As illustrated in FIG. 9, the storage virtualization apparatus 10B includes a cluster control unit 11, a storage unit 12 and a virtual volume control unit 13C. Further, the storage virtualization apparatus 10C includes a port 15 to communicate with other storage virtualization apparatuses 10C, a port 16 to communicate with the servers 80 (see FIG. 3), and two ports 17 that will be connected with a plurality of storage ports 51 (see FIG. 3) across the plurality of storage devices 50.

The cluster control unit 11, the storage unit 12 and the ports 15-17 of this storage virtualization apparatus 10B are the same as the cluster control unit 11, the storage unit 12 and the ports 15-17 of the storage virtualization apparatus 10, respectively.

Figure 10:
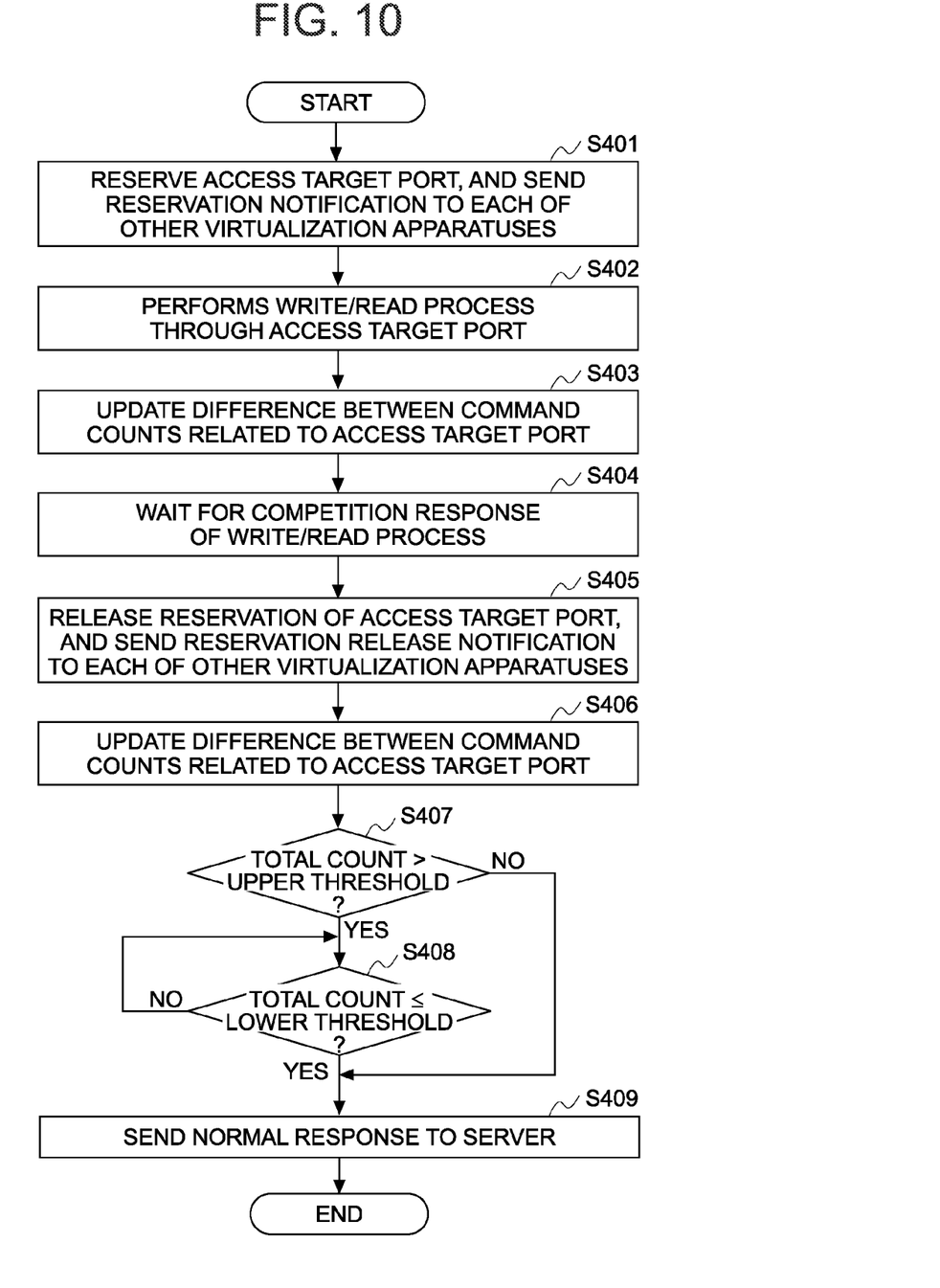
FIG. 10 is a flowchart of a write request responding process performed by a virtual volume control unit of the storage virtualization apparatus according to the third embodiment.

The virtual volume control unit 13C is a unit (functional block) that performs, when receiving an access request from a server 80, a virtual volume control process in a procedure illustrated in FIG. 10

Namely, the virtual volume control unit 13C having received an access request from a server 80 refers to the mapping information, thereby specifying the storage port 51 to which a command for responding the access request is to be issued (which will be hereinafter denoted as the access target port) (step S401). Then, the virtual volume control unit 13C reserves the access target port and sends reservation notification to each of other storage virtualization apparatuses 10C (virtualization apparatuses in FIG. 10) (step S401).

Subsequently, the virtual volume control unit 13 issues to the access target port a read/write command for making the storage device 50 (the CM in the storage device 50) perform a read/write process the contents of which is specified by the received access request (step S402).

Further, the virtual volume control unit 13C performs a process of updating the difference of the command counts related to the access target port stored in the storage unit 12 (step S403). Specifically, the virtual volume control unit 13C adds "1" to the difference of the command counts related to the access target port.

The virtual volume control unit 13C having finished the process of step S403 waits for receiving a completion response (information indicating that the write process is completed, data read by the read process) of the write/read process from the access target port (step S404).

The virtual volume control unit 13 having received the completion response releases the reservation of the access target port and sends the reservation release notification to each of other storage virtualization apparatus 10 (step S405). Further, the virtual volume control unit 13C performs a process of updating the difference between the command counts related to the access target port (a process of subtracting "1" from the difference between the command counts related to the access target port in the storage unit 12) (step S406).

Thereafter, the virtual volume control unit 13C compares the process incomplete command total count ("total count" in FIG. 10) and the upper threshold which are stored in the storage unit 12 as information related to the access target port (step S407).

When the process incomplete command total count related to the access target port is less than or equal to the upper threshold related to the access target port (step S407; NO), the virtual volume control unit 13C sends back the normal response (information indicating that the write process is completed, the data read by the read process) to the server 80 that has transmitted the access request (step S409). Then, the virtual volume control unit 13C terminates this virtual volume control process.

On the other hand, when the process incomplete command total count is greater than the upper threshold (step S407; YES), the virtual volume control unit 13C waits until the process incomplete command total count related to the access target port becomes a value less than or equal to the lower threshold related to the access target port (step S408).

Then, the virtual volume control unit 13C, when the process incomplete command total count related to the access target port becomes less than or equal to the lower threshold related to the access target port, sends back the normal response to the server 80 that has transmitted the access request (step S409), and thereafter terminates the virtual volume control process.

Figure 11:
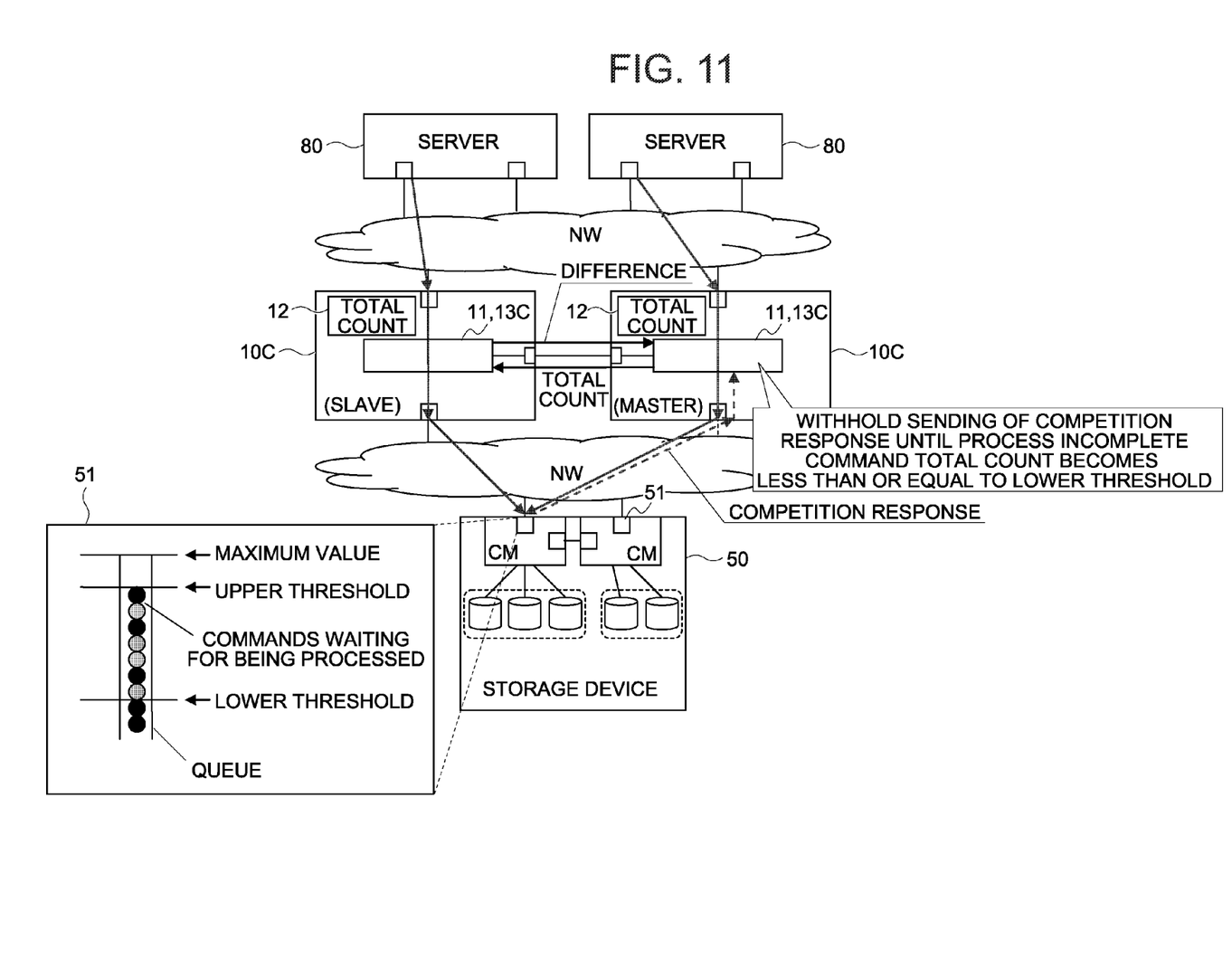
FIG. 11 is an explanatory diagram of function of the storage virtualization apparatus according to the third embodiment.

As described above, the storage virtualization apparatus 10C constantly accumulates the difference between the command counts related to each storage port 51 as with the storage virtualization apparatuses 10 and 10B. The master virtualization apparatus, as schematically illustrated in FIG. 11, periodically obtains the difference between the command counts ("difference" in FIG. 11) related each storage port 51 from each slave virtualization apparatus, and calculates, with respect to each storage port 51, the process incomplete command total count ("total count" in FIG. 11) that is a total of the differences between the command counts that the master virtualization apparatus itself accumulates and the differences between the command counts that the slave virtualization apparatus accumulates. Further, the master virtualization apparatus stores the calculated results internally (in the storage unit 12) and distributes them to each slave virtualization apparatus, and each slave virtualization apparatus, to which process incomplete command total counts related to storage ports 51 are distributed, stores the calculated results internally (in the storage unit 12).

Moreover, when receiving an access request from a server 80, the storage virtualization apparatus 10C (the master/slave virtualization apparatus) issues a command to the access target port. When receiving the complete response to the issued command, the storage virtualization apparatus 10C compares the process incomplete command total count with the upper threshold. In other words, the storage virtualization apparatus 10C judges whether the number of commands in the queue of the access target port which are waiting for being processed (≈the process incomplete command total count) is larger than the upper threshold.

Then, the storage virtualization apparatus 10C, when the process incomplete command total count is larger than the upper threshold, waits until the process incomplete command total count becomes a value less than or equal to the lower threshold, and thereafter issues the competition response to the access target port.

The storage virtualization apparatus 10C according to the present embodiment is one that operates as mentioned above. And, a delay of the completion response to the access request can allow the transmitting timing of the next access request of the server 80 to be delayed. Accordingly, with storage virtualization apparatus 10C used, it is feasible to construct easily (in a way that does not require a system design in consideration performance, etc. of each storage device 50) the storage virtualization system in which Queue Full hardly occurs at each storage port 51 across the storage devices 50.

<<Modifications>>

Various modifications are possible for the storage virtualization apparatus (10, 10B, or 10C) according to each above-mentioned embodiment. For example, the storage virtualization apparatus (10, 10B, or 10C) according to each above-mentioned embodiment can be modified into an apparatus wherein the lower threshold matches the upper threshold agrees with the lower threshold (an apparatus wherein the same values are set as both thresholds, an apparatus wherein one value is used each of the lower and upper values).

The storage virtualization apparatus 10C can also be modified into an apparatus including a cache memory. The storage virtualization apparatus according to each above-mentioned embodiment can be modified into an apparatus that is non-distinguishable between master and slave, i.e., "an apparatus that does not obtain the process incomplete command total count from the other storage virtualization apparatuses, and periodically obtains the difference between the command counts from each of the other storage virtualization apparatuses to calculate the process incomplete command total count."

Moreover, it is taken for granted that the configuration of the computer 20 that is made operate as the storage virtual apparatus may be differentiated from that illustrated in FIG. 4, and that the storage virtual apparatus may be actualized not as the computer 20 on which program is installed but as an dedicated apparatus.

Furthermore, with regard to the above technology, the following note is disclosed.

(Note 1) A storage virtualization apparatus cluster for making a plurality of storage devices function as one or more virtual volumes, the cluster comprising:

a first storage virtualization apparatus and one or more second storage virtualization apparatus each of which is connected with a plurality of storage ports across the plurality of storage devices;

the first storage virtualization apparatus including:

an accumulate unit to accumulate, with respect to each of the plurality of storage ports, a process incomplete command count defined as number of commands that are sent by the first storage virtualization apparatus, but are not yet processed by the storage device having each storage port;

a management unit to periodically obtain, from each of other storage virtualization apparatuses connected to any one of the plurality of storage ports, the process incomplete command count accumulated by the storage virtualization apparatus, calculates, with respect to each of the plurality of storage ports, a process incomplete command total count that is a total of the process incomplete command count obtained from each of the other storage virtualization apparatuses and the process incomplete command count accumulated by the accumulate unit, sends the calculated process incomplete command total counts to each of the second storage virtualization apparatus and manages the calculated process incomplete command total counts; and an access request responding unit to perform, when receiving an access request against any one of the plurality of storage devices from a server, an access responding process including a process of issuing a command to a storage port corresponding to the access request, wherein the access request responding unit, when the process incomplete command total count about the storage port corresponding to the access request managed by the management unit is larger than a prescribed number, delays completion timing of an access responding process to the access request, each of the one or more second storage virtualization apparatus including:

a second accumulate unit to accumulate, with respect to each of the plurality of storage ports, the process incomplete command count defined as number of commands that are sent by the second storage virtualization apparatus, but are not yet processed by the storage device having each storage port;

a sending unit to send the process incomplete command count about each storage port to the first storage virtualization apparatus;

a second management unit to manage the process incomplete command total count about each storage port that is sent from the first storage virtualization apparatus;

a second access request responding unit to, when receiving an access request against any one of the plurality of storage devices, obtain the process incomplete command total count corresponding to the received access request from the second storing unit, and to, when the obtained process incomplete command total count is larger than a prescribed number, cause completion timing of an access responding process to the access response to be delayed; and a second access request responding unit to perform, when receiving an access request from a server, an access responding process including a process of issuing a command to a storage port corresponding to the access request, wherein the second access request responding unit, when the process incomplete command total count about the storage port corresponding to the access request managed by the second management unit is larger than the prescribed number, delays completion timing of the access responding process to the access request.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that the various changes, substitutions, and alterations could be made hereto without departing from the spirit and scope of the invention.

What is claimed is:

1. A storage virtualization apparatus that controls access to one or more storage devices with a second storage virtualization apparatus, the storage virtualization apparatus comprising:
    a controller;
    a memory;
    a first interface; and
    a second interface,
    wherein the storage devices include a storage port connected to the storage virtualization apparatus via the first interface, the storage port being connected to the second storage virtualization apparatus via a first interface of the second storage virtualization apparatus, the controller executes processes comprising:
    storing in the memory, a process incomplete command count calculated from a number of received access requests and a number of completed access requests;
    obtaining, via the second interface, from the second storage virtualization apparatus connected to the storage port, a process incomplete command count with respect to the storage port calculated by the second storage virtualization apparatus;
    storing in the memory, a process incomplete command total count to be obtained based on the process incomplete command count obtained from the second storage virtualization apparatus and the process incomplete command count obtained from the memory;
    notifying, via the second interface, the second storage virtualization apparatus of the obtained process incomplete command total count so as to update a process incomplete command total count in the second storage virtualization apparatus; and
    causing, upon receiving an access request to any one of the storage devices, when the obtained process incomplete command total count with respect to the storage port corresponding to the received access request is larger than a prescribed number, completion timing of an access responding process to the access request to be delayed.

2. The storage virtualization apparatus according to claim 1, further comprising a third interface connected to a server, wherein the causing includes performing, when the obtained process incomplete command total count is larger than the prescribed number, a process of issuing a command to the storage port corresponding to the received access request, and making sending back to the server via the third interface, of a response to the command be delayed until the process incomplete command total count becomes less than or equal to a second prescribed number.

3. The storage virtualization apparatus according to claim 2, wherein the second prescribed number is equal to the first prescribed number.

4. The storage virtualization apparatus according to claim 1, wherein the causing includes making, when the obtained process incomplete command total count is larger than the prescribed number, a start of the access responding process to the received access request be delayed until the process incomplete command total count becomes less than or equal to a second prescribed number.

5. The storage virtualization apparatus according to claim 1, wherein the access responding process to a write request performed is a process of storing the write request into a memory, notifying a sender of completion of response to the write request, and sending a command to a storage port corresponding to the write request.

6. The storage virtualization apparatus according to claim 1, wherein the prescribed number is a value determined on per storage port basis.

7. A method of making one or more storage devices function as one or more virtual volumes by a first storage virtualization apparatus that controls access to the storage devices with a second storage virtualization apparatus, comprising:
    storing in a memory, a process incomplete command count calculated from a number of received access requests and a number of completed access requests;
    obtaining, via the second interface, from the second storage virtualization apparatus connected to the storage port, a process incomplete command count with respect to the storage port calculated by the second storage virtualization apparatus;
    storing in the memory, a process incomplete command total count to be obtained based on the process incomplete command count obtained from the second storage virtualization apparatus and the process incomplete command count obtained from the memory;
    notifying, via the second interface, the second storage virtualization apparatus of the obtained process incomplete command total count so as to update a process incomplete command total count in the second storage virtualization apparatus; and
    causing, upon receiving an access request to any one of the storage devices, when the obtained process incomplete command total count with respect to the storage port corresponding to the received access request is larger than a prescribed number, completion timing of an access responding process to the access request to be delayed.

8. The storage virtualization method according to claim 7, wherein the first virtualization apparatus, when the obtained process incomplete command total count is larger than the prescribed number, makes a start of the access responding process to the received access request be delayed until the process incomplete command total count becomes less than or equal to a second prescribed number.

9. The storage virtualization method according to claim 7, wherein the first virtualization apparatus further comprising a third interface connected to a server, when the obtained process incomplete command total count is larger than the prescribed number, performs a process of issuing a command to the storage port corresponding to the received access request, and thereafter makes sending back to the server via the third interface, of a response to the command be delayed until the process incomplete command total count becomes less than or equal to a second prescribed number.

10. A non-transitory computer readable medium storing a program for causing a computer connected to a storage port of one or more storage devices to execute a process of a storage virtualization apparatus with a second storage virtualization apparatus, the process comprising:
- storing in a memory, a process incomplete command count calculated from a number of received access requests and a number of completed access requests;
- obtaining, via the second interface, from the second storage virtualization apparatus connected to the storage port, a process incomplete command count with respect to the storage port calculated by the second storage virtualization apparatus;
- storing in the memory, a process incomplete command total count to be obtained based on the process incomplete command count obtained from the second storage virtualization apparatus and the process incomplete command count obtained from the memory;
- notifying, via the second interface, the second storage virtualization apparatus of the obtained process incomplete command total count so as to update a process incomplete command total count in the second storage virtualization apparatus; and
- causing, upon receiving an access request to any one of the storage devices, when the obtained process incomplete command total count with respect to the storage port corresponding to the received access request is larger than a prescribed number, completion timing of an access responding process to the access request to be delayed.

11. A storage virtualization apparatus cluster for making one or more storage devices function as one or more virtual volumes, the cluster comprising a first storage virtualization apparatus and a second storage virtualization apparatus, each further comprising:
- a controller;
- a memory;
- a first interface; and
- a second interface, wherein the storage devices include a storage port connected to the first storage virtualization apparatus and the second storage virtualization apparatus via the first interface of each, the controller of the first storage virtualization apparatus executing:
- storing in the memory of the first storage virtualization apparatus, a process incomplete command count calculated from a number of received access requests and a number of completed access requests;
- obtaining, via the second interface, from the second storage virtualization apparatus connected to the storage port, a process incomplete command count with respect to the storage port calculated by the second storage virtualization apparatus;
- storing in the memory of the first storage virtualization apparatus, a process incomplete command total count to be obtained based on the process incomplete command count obtained from the second storage virtualization apparatus and the process incomplete command count obtained from the memory of the first storage virtualization apparatus;
- notifying, via the second interface, the second storage virtualization apparatus of the obtained process incomplete command total count so as to update a process incomplete command total count in the second storage virtualization apparatus; and
- causing, upon receiving an access request to any one of the storage devices, when the process incomplete command total count with respect to the storage port corresponding to the received access request is larger than a prescribed number, completion timing of an access responding process to the access request to be delayed, the controller of the second storage virtualization apparatus executing:
- storing in a memory of the second storage virtualization apparatus, a process incomplete command count calculated from a number of received access requests and a number of completed access requests;
- sending the process incomplete command count of the second storage virtualization apparatus with respect to the storage port to the first storage virtualization apparatus;
- managing the process incomplete command total count with respect to the storage port that is sent from the first storage virtualization apparatus;
- issuing, upon receiving an access request a command to a storage port corresponding to the access request; and
- delaying, when the process incomplete command total count with respect to the storage port corresponding to the access request managed by the second storage virtualization apparatus is larger than the prescribed number, completion timing of the access responding process to the access request.

* * * * *